United States Patent [19]

Johnston

[11] Patent Number: 5,506,818
[45] Date of Patent: Apr. 9, 1996

[54] SEISMIC SOURCE SYSTEM UTILIZING A SMALL DIAMETER HOSE BUNDLE

[75] Inventor: Otis A. Johnston, League City, Tex.

[73] Assignee: I/O Exploration Products (U.S.A.), Inc., Stafford, Tex.

[21] Appl. No.: 496,984

[22] Filed: Jun. 30, 1995

Related U.S. Application Data

[63] Continuation of Ser. No. 219,908, Mar. 30, 1994, abandoned, which is a continuation of Ser. No. 962,521, Oct. 15, 1992, abandoned.

[51] Int. Cl.⁶ ................................................. G01V 1/38
[52] U.S. Cl. ................................................. 367/144; 174/47
[58] Field of Search ........................ 367/20, 144, 153, 367/154; 174/47, 101.5

[56] References Cited

U.S. PATENT DOCUMENTS

| | | | |
|---|---|---|---|
| 3,746,832 | 7/1973 | Bernard et al. | 174/47 |
| 4,525,813 | 6/1985 | Burrage | 367/144 |
| 4,597,065 | 6/1986 | Lien et al. | 367/20 |

FOREIGN PATENT DOCUMENTS 447816  5/1936  United Kingdom ............... 174/47

Primary Examiner—Ian J. Lobo
Attorney, Agent, or Firm—Tim Headley; Haynes and Boone

[57] ABSTRACT

This invention is a seismic source system for marine surveying using a small diameter hose bundle containing an electrical cable disposed within an air hose which is reinforced with torque-balanced layers of armor components and protective jacket and connected to a termination assembly at one end for connection to an electrical power supply, pressurized air supply and control system and connected to another termination assembly at the other end for connection to an air gun subarray comprising multiple air guns.

4 Claims, 5 Drawing Sheets

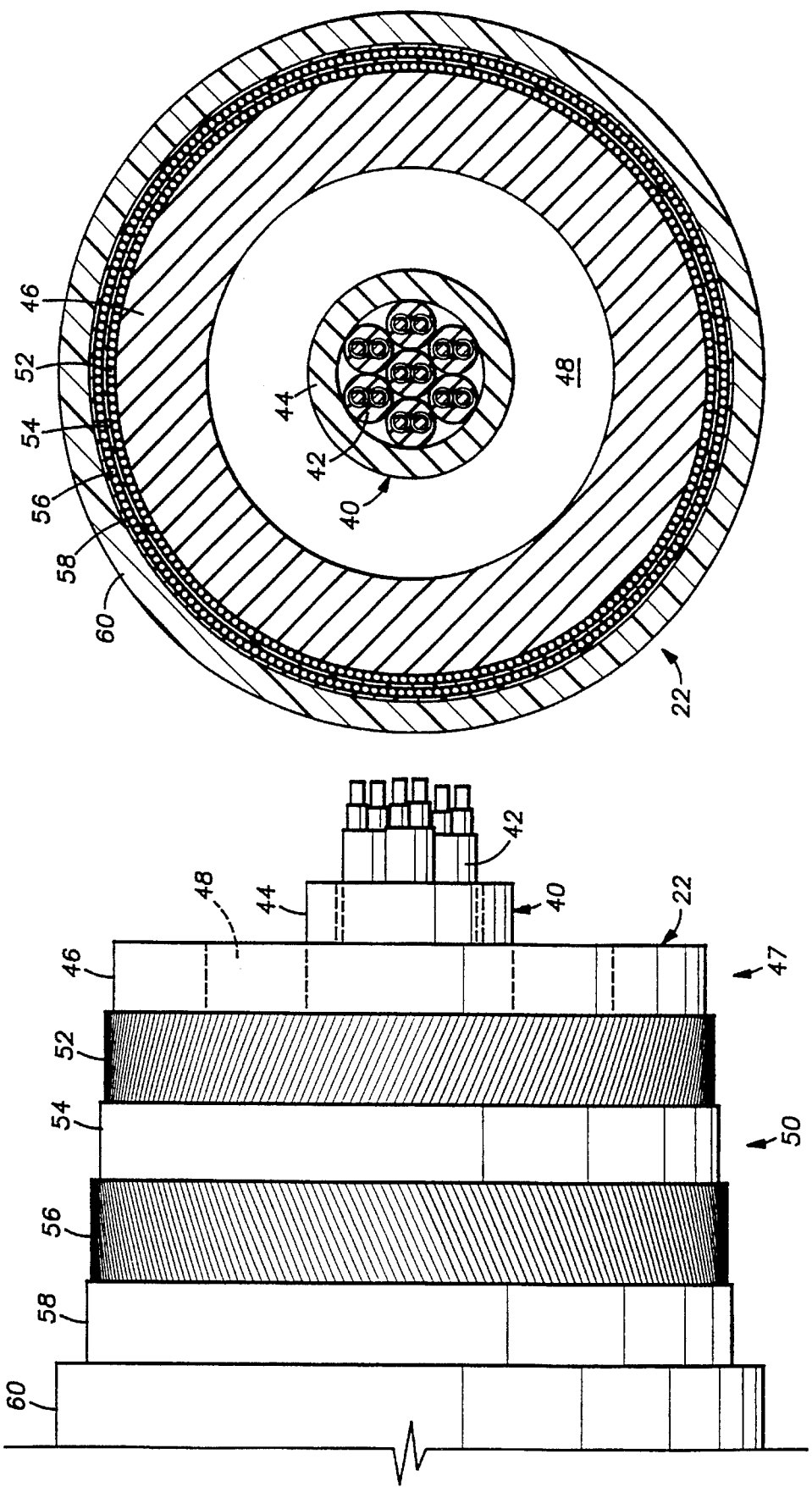

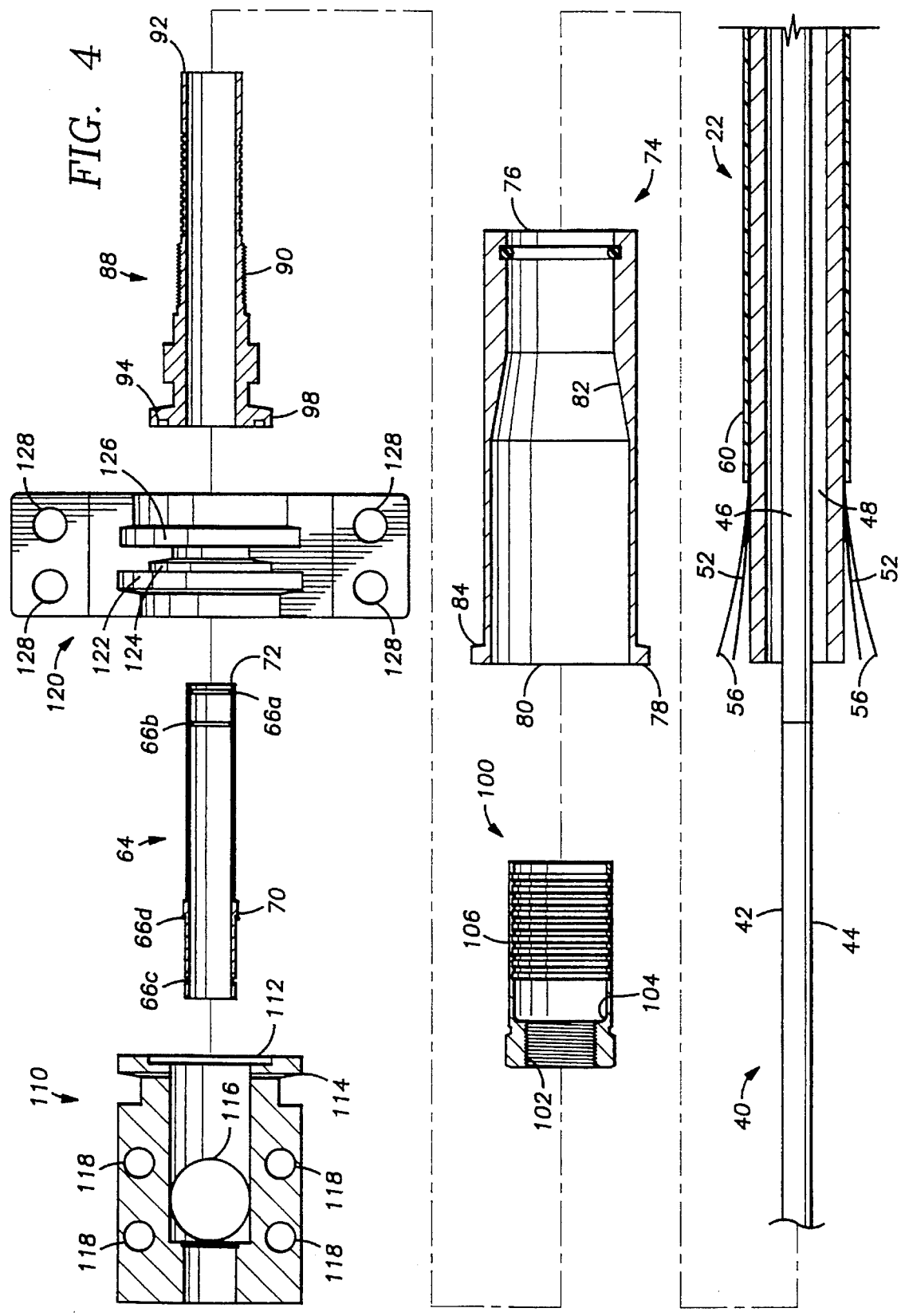

5,506,818

SEISMIC SOURCE SYSTEM UTILIZING A SMALL DIAMETER HOSE BUNDLE

This is a continuation of application Ser. No. 08/219,908 filed on Mar. 30, 1994 now abandoned which is a continuation of application Ser. No. 07/962,521 filed on Oct. 15, 1992 now abandoned.

BACKGROUND OF THE INVENTION

1. Field of the Invention

The present invention relates to an apparatus for use in seismic exploration and more specifically to a seismic source system utilizing a hose bundle for use in marine seismic exploration.

2. Description of Related Art

In the field of marine seismic exploration (surveying), an acoustic signal is generated in a body of water by a source such as an air gun. Typically, several air guns are arranged in spaced relationship to each other. Such arrangement generally is referred to as a subarray. One or more air gun subarrays are towed behind a vessel to perform seismic surveying. In typical operation, one end of a hose bundle (also referred to as an umbilical) is connected to an air gun subarray (one hose bundle per air gun subarray) and the other end of the hose bundle is connected to equipment on the vessel. The hose bundle supplies compressed air and electrical power to the air guns and also provides electrical communication between the air guns and the equipment on the vessel.

A typical prior art hose bundle contains an air hose in the middle of the hose bundle for carrying pressurized air to the air guns. A number of insulated electrical conductors are placed around the air hose for carrying electrical power to the air guns and for providing communication between the air guns and the equipment on the vessel. An outer-shell having armor components and an outer protective jacket is placed around the electrical conductors. Each hose bundle is several hundred feet in length and is normally stored on the vessel by winding the hose bundle on a storage reel which imparts a certain amount of stress on the electrical conductors.

In the prior art hose bundle, the electrical conductors become an integral, non-removable part of the hose bundle during the manufacturing process. Therefore, damaged electrical conductors cannot be removed and/or replaced with new electrical conductors once the hose bundle has been manufactured. To minimize this problem, it is common in the prior art to include spare electrical conductors in the hose bundle. The spare electrical conductors allow for the continued use of the hose bundle even after some of the electrical conductors become damaged and non-operative. The spare electrical conductors, however, are exposed to the same wear conditions as the remaining electrical conductors.

Another problem with the prior art hose bundle is its diameter which affects the overall weight and manufacturing cost of the hose bundle and the operational costs of storing and towing the hose bundle during seismic surveying operations. As previously noted, the hose bundle is typically several hundred feet in length and even a small increase in the diameter of the hose bundle results in a large increase in the overall weight of the hose bundle. The larger diameter of the hose bundle also results in more drag when it is towed behind the vessel during surveying operations. This drag requires the vessel to use more fuel thus increasing operational expenses and also creates additional stress on the hose bundle which can result in a shorter life.

There has been a long felt, yet unsolved need for a more reliable, smaller diameter hose bundle. The present invention provides a hose bundle that addresses the above-noted problems associated with the prior art hose bundles.

SUMMARY OF THE INVENTION

The present invention provides a seismic source system utilizing a novel hose bundle assembly. The hose bundle assembly contains a hose bundle and a separate termination assembly at each end of the hose bundle. The hose bundle is configured with an armored air hose for carrying high pressure air therethrough and an electrical cable containing electrical conductors loosely disposed inside the air hose.

Examples of the more important features of the invention thus have been summarized rather broadly so that the following detailed description may be better understood and so that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein:

FIG. 2a shows the layers of component parts in the hose bundle.

FIG. 2b shows a cross-sectional view of the hose bundle.

FIG. 4 shows a cross-sectional, exploded view of certain component parts contained in the supply termination assembly.

DESCRIPTION OF THE PREFERRED EMBODIMENT

Figure 1:
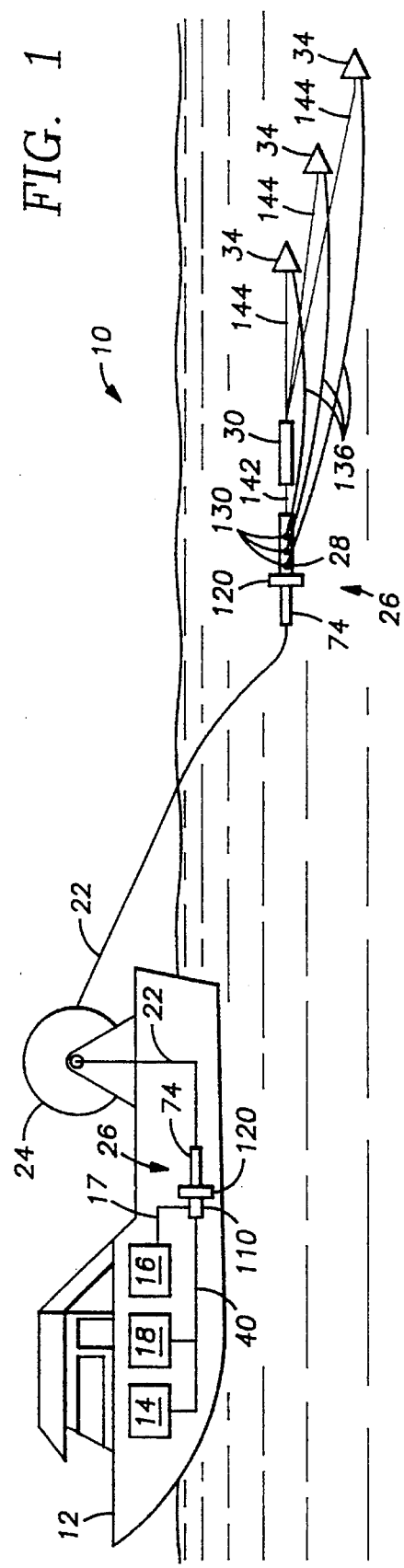
FIG. 1 shows an elevation view of a seismic source system having a hose bundle and associated air gun stations towed behind a vessel.

FIG. 1 shows a seismic source system 10 of the present invention in operation with a vessel 12 which contains a control system 14, a pressurized air supply 16 and an electrical power supply 18. The seismic source system 10 contains a supply termination assembly 20 with a tow adapter 110, a hose bundle 22, a storage reel 24, a distribution termination assembly 26 with a manifold 28, a source synchronizer 30 and an air gun subarray made up of a plurality of air gun stations 34. The control system 14, preferably a computer-based system, is located on the vessel although alternative configurations such as remote systems may be used. Compressors normally are used as the source of pressurized air.

FIGS. 2a and 2b show the layers and a cross-sectional view, respectively, of the hose bundle 22. An electrical cable 40 having a number of pairs of electrical conductors 42 wrapped in an insulation layer 44 is disposed within an armored air hose 47.

The multiple pairs of insulated electrical conductors 42 are used to transmit electrical power from the electrical power supply 18 located on the vessel 12 to the manifold 28, the source synchronizer 30 and the air gun stations 34 and to transmit data signals to and from the control system 14. The pairs of electrical conductors 42 are enclosed within the insulation layer 44 which is made of a material such as high density polyurethane to stabilize the electrical characteristics, such as capacitance and impedance, of the electrical system.

The insulation layer 44 is designed to withstand high pressure and to have stable electrical characteristics. The insulation material is selected for its ability to withstand high pressure changes and for its ability to resist the erosion forces from the fast flowing air over the electrical cable 40. The erosion forces are very strong at the inlet portion of the supply termination assembly 20 where the fast flowing air changes direction causing high turbulence.

The air space 48 between the outside of the electrical cable 40 and the inside of the armored air hose 47 is made large enough to carry the volume of pressurized air needed to operate the air guns (not shown) in the air gun stations 34.

In the preferred embodiment, the armored air hose 47 is formed by encasing an air hose 46 with armor components 50 containing at least two layers of flexible, reinforcing material wound helically in opposing directions. By torque balancing the armor components 50, the hose bundle 22 will resist twisting under varying longitudinal load conditions. The high-strength, low-density synthetic aramid fiber Kevlar (manufactured by DuPont) or another material with similar characteristics may be used to form the armor components 50.

A first layer of Kevlar fibers 52 is helically wound around the air hose 46 and then encased with a first layer 54 of a material such as Mylar tape to hold the Kevlar fibers in place. A second layer of Kevlar fibers 56 is then helically wound around the first layer of Mylar tape 54 in a direction which is opposite to the winding direction of the first layer of Kevlar fibers 52. The second layer of Kevlar fibers 56 is encased with a second layer of Mylar tape 58. The pairs of Kevlar fiber layers wound in opposing directions provide the necessary torque balance by providing structural symmetry. More layers of protective components 50 can be used but should be applied such that structural balance is maintained.

A protective jacket 60 is then applied around the final layer of Mylar tape 58. One method used to form the protective jacket 60 is to extrude a flexible, durable material such as high density polyurethane around the second layer of Mylar tape 58.

A hose bundle 22 made as described above has been found to be sufficiently flexible and does not cause either excessive stresses when the hose bundle 22 is wound onto the storage reel 24 or excessive wear caused by stretch loads due to the movement through the water.

By loosely disposing the electrical cable 40 within the armored air hose 47 with the only connections being located in the two termination assemblies 20 and 26, minimal stress is placed on the electrical conductors 42 during storage on the storage reel 24 and during towing operations. If either the electrical cable 40 or the armored air hose 47 gets damaged, either can be replaced without the need to replace both.

Figure 3A:
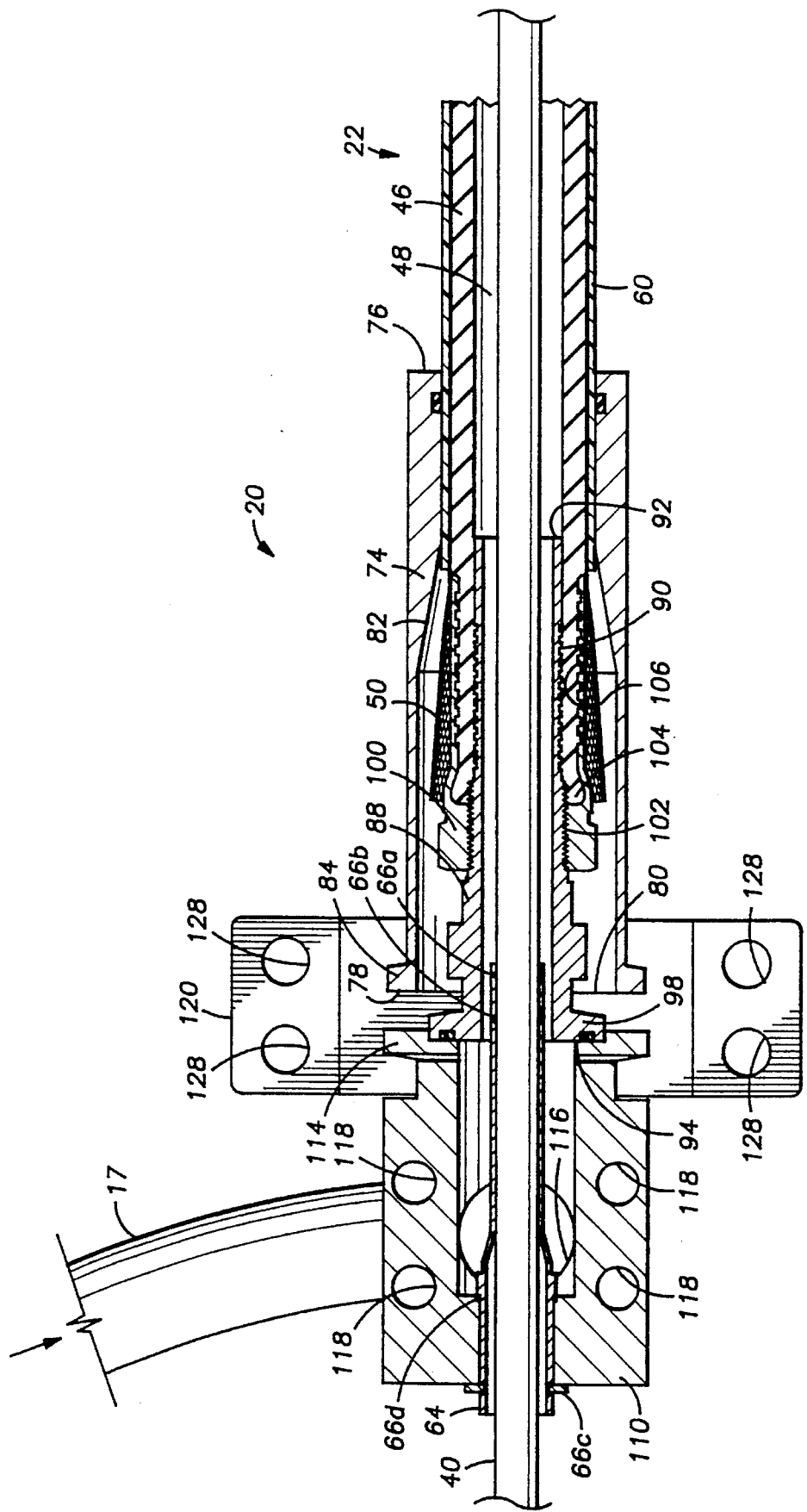
FIGS. 3a and 3b show cross-sectional views of the supply and distribution termination assemblies, respectively.

FIG. 3a shows a cross-sectional view of the supply termination assembly 20 which connects one end (the receiving end) of the hose bundle 22 to the control system 14, the compressors 16 and the electrical power supply 18.

Figure 3B:
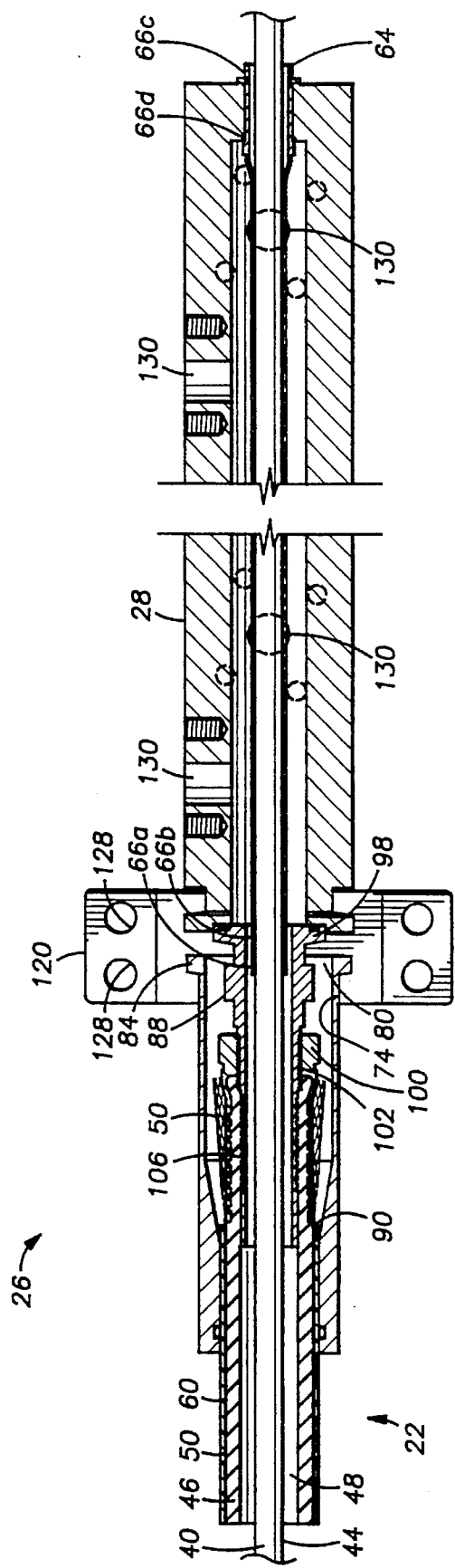

The distribution termination assembly 26 (FIG. 3b) has the components placed on the other end (the distribution end) of the hose bundle 22 in the reverse order and can be the mirror image of the supply termination assembly 20 utilizing the tow adapter 110 or using the manifold 28 as shown in FIG. 3b. The components of the supply and distribution termination assemblies 20 and 26 preferably are made of non-corrosive materials such as stainless steel.

The method of installing the supply termination assembly 20 at the receiving end of the hose bundle 22 will now be described in detail while referring to FIGS. 3a and FIG. 4 which shows certain of the components of the supply termination assembly 20 in an exploded view.

The protective jacket 60, armor components 50 and air hose 46 are removed from one end of the hose bundle 22 to expose the electrical cable 40 and to provide enough length to connect the electrical cable 40 to the control system 14 and the electrical power supply 18. An additional portion of the protective jacket 60 and the air hose 46 are then removed leaving the exposed armor components 50 overlapping the air hose 46 as shown in FIG. 3a. The exposed armor components 50 are temporarily taped back against the outside of the hose bundle 22 exposing the outside surface of the air hose 46.

The exposed electrical cable 40 is then slipped into a crimp apparatus 64 (steel jacket) fitted with O-rings 66a–d until the bottom end 72 of the crimp apparatus 64 is near the leading edge of the air hose 46. O-rings 66a and 66b are located in internal grooves (not shown) with a shallow radius and O-ring 66c is positioned in an aperture (not shown) near the top of the crimp apparatus 64. O-ring 66d is placed around the top portion of the crimp apparatus 64 so that it rests on a shoulder 70 of the crimp apparatus 64. The crimp apparatus 64 is then crimped against the electrical cable 40 and O-rings 66a–b located in apertures inside the crimp apparatus 64 form a seal between the crimp apparatus 64 and the electrical cable 40.

The crimp apparatus 64 protects the electrical cable 40 from air turbulence in the area where pressurized air flows into the tow adapter 110 in the supply termination assembly 20 and enters the manifold 28 in the distribution termination assembly 26. The air in the preferred embodiment is brought in at an angle of 90 degrees from the original flow of air but other angles can be used. Polyethylene is a preferred material for the electrical cable 40 because of its minimal air drag.

The end of the hose bundle 22 with the crimp apparatus 64 is then fed through an armor pot 74 until the top 78 of the armor pot 74 is below the start of the exposed armor components 50. The armor pot 74 has an internal taper 82 such that the aperture in the bottom end 76 of the armor pot 74 is narrower than the aperture 80 in the top 78 of the armor pot 74. The pull on the armor pot 74 will be from the top 78 and, therefore, a tight seal will be formed at the bottom end 76. An O-ring (not shown) located in an aperture on the bottom end 76 of the interior wall of the armor pot 74 provides a seal between the armor pot 74 and the hose bundle 22.

A nipple 88 with outside threads 90 is attached to a ferrule 100 (socket) having inside threads 102. The end of the hose bundle 22 containing the crimp apparatus 64 is then fed through the nipple 88 and the ferrule 100 until the bottom 92 of the nipple 88 is aligned with the start of the exposed armor components 50. The exposed air hose 46 is slipped between the outside of the nipple 88 and the inside of the ferrule 100. The end of the exposed portion of the air hose 46 fits against the inside top surface 104 of the ferrule 100. The bottom end 72 of the crimp apparatus 64 will be disposed just inside the top of the nipple 88.

The exposed armor components 50 are then untaped and helically rewound around the outside threaded surface 106 of the ferrule 100 in the same direction as originally wound. The armor pot 74 is then pulled into place around the nipple 88. Epoxy is poured into an aperture 80 in the top 78 of the armor pot 74 filling the void between the armor components 50, which were wound around the outer surface 106 of the ferrule 100, and the inner surface of the armor pot 74. The epoxy is selected for its ability to adhere to the material used for the armor components 50. In the preferred embodiment, the epoxy adheres to Kevlar fibers.

After the epoxy dries, the tow adapter 110 is slipped onto the electrical cable 40 until the top 94 of the nipple 88 fits into a bottom groove 112 of the tow adapter 110. An O-ring (not shown) in an aperture 96 in the top 94 of the nipple 88 forms a seal between the nipple 88 and the tow adapter 110. The tow adapter 110 in the supply termination assembly 20 is located at the end towards the storage reel 24 on the vessel 12. The tow adapter 110 or the manifold 28 in the distribution termination assembly 26 is located at the end towards the air gun stations 34.

The tow adapter 110, the nipple 88 and the armor pot 74 are then positioned within the bottom half of a termination clamp 120 by forcing a tow adapter ridge 114, a nipple ridge 98 and an armor pot ridge 84 into grooves 122, 124 and 126, respectively, in the bottom half of the termination clamp 120. The grooves 122, 124 and 126 are slightly smaller than the ridges 114, 98 and 84, respectively, to provide a watertight seal. The top half (not shown) of the termination clamp 120 is then positioned by forcing ridges 114, 98 and 84 into similar grooves in the top half of the termination clamp 120. The two halves of the termination clamp 120 are then bolted together using threaded bolts (not shown) in bolt holes 128.

The electrical conductors 42 in the electrical cable 40 are connected to the electrical power supply 18 and the control system 14. The compressors 16 are connected to the hose bundle 22 through an air compressor hose 17 into an inlet port 116 in the tow adapter 110. The above combination of elements provides a means within the supply termination assembly 20 for transferring the pressurized air from the inlet port 116 into the armored air hose 47.

As shown in FIG. 3b, the distribution termination assembly 26 is assembled on the other end of the hose bundle 22 in a manner similar to that used for the supply termination assembly 20 except that the components of the distribution termination assembly 26 are placed onto the hose bundle 22 in reverse order and the manifold 28 is used instead of a tow adapter 110 for the preferred embodiment. The electrical cable 40 extends through the manifold 28 and connects to the source synchronizer 30.

Figure 5:
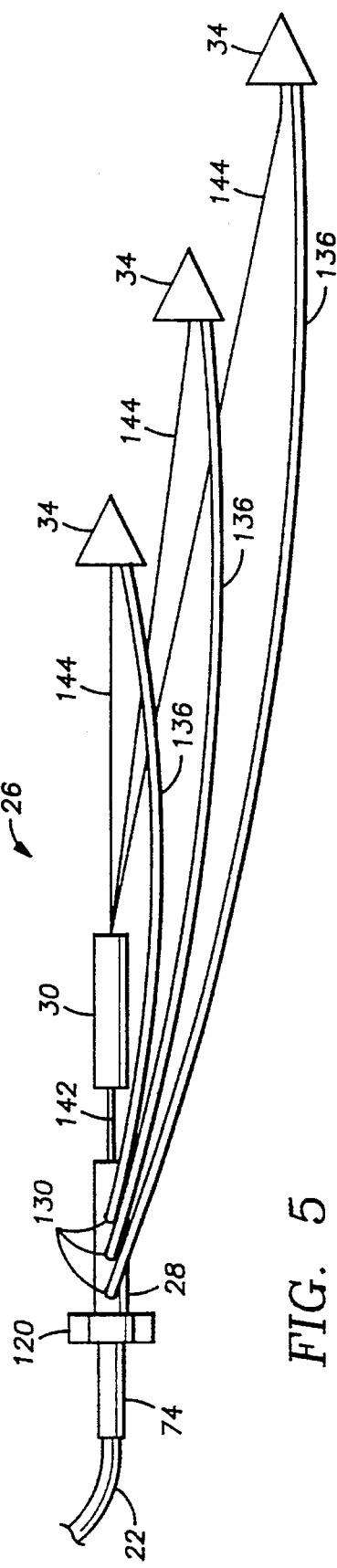
FIG. 5 shows a diagrammatic view of the underwater portion of the present invention.

FIG. 5 shows the underwater portion of the seismic source system 10. The manifold 28 has one outlet port 130 for each air gun station 34 in the air gun subarray. An air gun station 34 can contain a single air gun (not shown) or multiple air guns (not shown) depending on the configuration of the system being used. Pressurized air is distributed through the air outlet ports 130 into air outlet hoses 136 which are connected to individual air guns (not shown). The combination of the components of the distribution termination assembly 26 provide a means within the distribution termination assembly 26 for transferring the pressurized air from the armored air hose 47 to the outlet ports 130.

The electrical cable 40 extends through the manifold 28 (FIG. 3b) to supply electrical power to the source synchronizer 30 through a source synchronizer electrical cable 142 and to the air gun stations 34 through air gun station electrical cables 144. Electrical signals also are transmitted between the air gun stations 34 and the source synchronizer 30 through the air gun station electrical cables 144.

The source synchronizer 30 is used to activate all air guns in the air gun subarray 34 at the same time by transmitting electrical signals through the air gun station electrical cables 144. By distributing pressurized air and electrical power and signals from the manifold 28 and the source synchronizer 30, which are located underwater in close proximity to the air gun stations 34, fewer pairs of electrical conductors 42 are required in the hose bundle 22.

The foregoing description of the invention is intended to be a description of a preferred embodiment. Various changes in the details of the described apparatus may be made without departing from the scope of the invention.

I claim:

1. A hose bundle, comprising:
   (a) an air hose for carrying pressurized air;
   (b) an electrical cable placed inside the air hose for carrying electrical power and signals;
   (c) a first layer of flexible armor material helically wound around the air hose;
   (d) first holding means placed around the first layer of flexible armor material for holding the first layer of flexible armor material in position;
   (e) a second layer of flexible armor material helically wound around the first holding means in a direction which is opposite to the winding direction of the first layer of flexible armor material;
   (f) second holding means placed around the second layer of flexible armor material for holding the second layer of flexible armor material in position; and
   (g) a protective coating disposed over the second holding means.

2. A seismic source system, comprising:
   (a) a hose bundle having a first end and a second end, further including:
      (i) an armored air hose for carrying pressurized air; and
      (ii) an electrical cable placed inside the air hose for carrying electrical power and signals;
   (b) a supply termination assembly coupled to the first end of the hose bundle for receiving pressurized air and electrical power and for transmitting electrical signals;
   (c) a distribution termination assembly coupled to the second end of the hose bundle for distributing pressurized air and electrical power and for transmitting electrical signals; and
   (d) an air gun subarray having a plurality of air guns connected to the distribution termination assembly for receiving pressurized air and electrical power from the hose bundle and for transmitting electrical signals to and from the hose bundle.

3. The seismic source system of claim 2 for use on a vessel having a pressurized air supply, an electrical power supply and a control system, wherein the armored air hose is connected to the pressurized air supply through the supply termination assembly and the electrical cable extends through the supply termination assembly to connect with the electrical power supply and the control system.

4. A seismic source system for use on a vessel having a pressurized air supply, an electrical power supply and a control system, comprising:
   (a) a supply termination assembly having an inlet port for receiving pressurized air from the pressurized air supply;

(b) an air gun subarray having a plurality of air guns;

(c) a distribution termination assembly having an outlet port for discharging the pressurized air to the plurality of air guns;

(d) an armored air hose for carrying the pressurized air between the supply termination assembly and the distribution termination assembly;

(e) an electrical cable disposed within the armored air hose and having a first end extending through the supply termination assembly and connecting to the electrical power supply and the control system and a second end extending through the distribution termination assembly and connecting to the air gun subarray;

(f) means within the supply termination assembly for transferring the pressurized air from the inlet port into the armored air hose; and (g) means within the distribution termination assembly for transferring the pressurized air from the armored air hose to the outlet port.

* * * * *